US006959344B2

(12) United States Patent
Murotani et al.

(10) Patent No.: US 6,959,344 B2
(45) Date of Patent: Oct. 25, 2005

(54) METHOD AND APPARATUS FOR STORAGE SYSTEM

(75) Inventors: Akira Murotani, Odawara (JP); Toshio Nakano, Chigasaki (JP); Shizuo Yokohata, Ninomiya (JP); Kenichi Takamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/282,769

(22) Filed: Oct. 28, 2002

(65) Prior Publication Data

US 2003/0233502 A1 Dec. 18, 2003

(30) Foreign Application Priority Data

Jun. 14, 2002 (JP) ............................. 2002-174944

(51) Int. Cl.[7] ............................................ G06F 11/30
(52) U.S. Cl. .............................. 710/15; 710/5; 710/18; 710/19; 710/74; 711/111; 714/10; 714/43
(58) Field of Search ................................ 710/15, 74, 5, 710/18, 19; 711/112, 114, 111; 714/5–13, 714/42, 43

(56) References Cited

U.S. PATENT DOCUMENTS 6,009,535 A * 12/1999 Halligan et al. ............... 714/5

| 6,073,209 | A | 6/2000 | Bergsten |
| 6,073,218 | A | 6/2000 | DeKoning et al. |
| 6,279,078 | B1 | 8/2001 | Sicola et al. |
| 6,321,298 | B1 | 11/2001 | Hubis |
| 6,457,098 | B1 | 9/2002 | DeKoning et al. |
| 6,629,264 | B1 | 9/2003 | Sicola et al. |
| 2002/0152355 | A1 | 10/2002 | Otterness et al. |
| 2003/0065841 | A1 | 4/2003 | Pecone |
| 2003/0084237 | A1 | 5/2003 | Yoshida et al. |
| 2003/0105767 | A1 * | 6/2003 | Sonoda et al. .............. 707/100 |
| 2003/0110330 | A1 | 6/2003 | Fujie et al. |

* cited by examiner

Primary Examiner—Ilwoo Park
(74) Attorney, Agent, or Firm—Townsend and Townsend and Crew LLP

(57) ABSTRACT

A storage control system comprises a plurality of controllers, each of the controllers receiving a data-input/output request inputted via an external communication path and sending a data-input/output command to storage means; and an internal communication path through which the controllers carry out the data-input/output command and data input/output. Each of the controllers comprises means for sending its own operational information towards other ones of the controllers via the internal communication path. The storage control system further comprises means for monitoring an operational state of each of the controllers based on the operational information sent from the sending means of the controllers.

18 Claims, 11 Drawing Sheets

| CONTROLLER | CONTROLLER TO BE MONITORED | TIMESTAMP | STATE |
|---|---|---|---|
| 100 | 110 | 2001/11/13 10:05:02 | NORMAL |
| 110 | 100 | 2001/11/13 10:02:15 | NORMAL |

FIG. 2

EXAMPLE OF DATA FOR HEARTBEAT IN STORAGE APPARATUS

| CONTROLLER NAME | CONTROLLER TO BE MONITORED | TIMESTAMP | STATE |
|---|---|---|---|
| ServerA | ServerB | 2001/11/13 10:05:02 | NORMAL |
| ServerB | ServerA | 2001/11/13 10:02:15 | NORMAL |

FIG. 10

METHOD AND APPARATUS FOR STORAGE SYSTEM

CROSS-REFERENCE TO RELATED APPLICATIONS

The present application claims priority upon Japanese Patent Application No. 2002-174944 filed Jun. 14, 2002, which is herein incorporated by reference.

BACKGROUND OF THE INVENTION

1. Field of the Invention

The present invention relates to a storage control system comprising a plurality of controllers connected via an internal communication path and receiving data-input/output commands inputted from an external communication path and carrying out data-input/output control of storage devices, and to a method of controlling the storage control system.

2. Description of the Related Art

Recently, needs for so-called NAS (Network Attached Storage) servers are increasing. The NAS server, as one type of storage product, is a storage control system provided with an inner file system and capable of handling data-input/output requests according to file destination.

Further, as one type of NAS server, there exists a product structured to accommodate in one housing or cabinet a plurality of controllers connected respectively to an external communication path such as a LAN and capable of respectively responding to process requests sent individually through the external communication path, in order to, for example, enhance process abilities. The storage control systems are often used for mission-critical circumstances, and are generally required to possess high availability.

Now, regarding failure detection between computers on a LAN, there has been conventionally known a mechanism for enhancing availability by exchanging heartbeat messages among the computers on the LAN and mutually monitoring their operational states. For example, in Japanese Patent Application Laid-open Publication No. 2000-222373, there is disclosed a mechanism for a clustered computer system, in which computers structuring a cluster periodically exchange heartbeat messages across a LAN and mutually monitor their operational states, and in case the heartbeat messages are not exchanged normally with a certain controller, data service carried out by that controller is appropriately handed over to another normally-operating controller. Further, in Japanese Patent Application Laid-open Publication No. 2001-100943, there is disclosed a cluster system in which two PC servers carry out communication for exchanging heartbeats by using a SCSI bus to which disk devices are connected.

In a storage control system structured to comprise a plurality of controllers as in the structure of FIG. 1, although each of the controllers are installed within the same housing, these controllers individually and respectively provide services for requests from an external communication path. Thus, alike the instances disclosed in the above-mentioned publications, in order to enhance availability, it is thought that it may be effective for the storage control system structured as above to comprise a mechanism in which the operational states are monitored between the controllers, and in case a failure is detected in one certain controller, the service carried out by that controller is handed over to another normally-operating controller.

In providing such a mechanism, there will be a need to appropriately select a communication path to be used for transmission of the operational information. For example, in the clustered computer system of the above-mentioned publication, the external communication path such as the LAN connecting the computers or a private communication path is used as the communication path for exchanging the operational information (in this example, the heartbeat messages).

However, the external communication path has problems in that reliability between the path is not sufficient, and the communication rate is not sufficient or is not constant. Further, in case of providing a private communication path, this will involve excessive costs since private facilities will be necessary.

On the other hand, in the above-mentioned storage control system structure shown in FIG. 1, the controllers are mutually connected by an internal communication path. The internal communication path is for carrying out data-input/output command and carrying out input/output of data, alike a control bus formed on a circuit board and connecting a CPU and a memory. Such an internal communication path generally has a higher reliability and a higher transmission ability compared to external communication paths such as LANs. Accordingly, it is thought that it would be possible to easily realize a mechanism for monitoring operational states between controllers with high reliability and at low costs, by using the internal communication path as a communication path for the operational information.

SUMMARY OF THE INVENTION

The present invention has been contrived according to the above and other aspects, and one object is to provide a storage control system for monitoring operational information using an internal communication path, and preferably to provide a high-performance, highly-reliable, and easy to structure storage control system which is capable of efficiently managing operational information using an internal communication path and which can realize a function of monitoring the operational information in an inexpensive manner.

In order to achieve the above and other objects, one aspect of the present invention is a storage control system comprising a plurality of controllers, each of the controllers receiving a data-input/output request inputted via an external communication path and sending a data-input/output command to storage means; and an internal communication path through which the controllers carry out the data-input/output command and data input/output. Each of the controllers comprises means for sending its own operational information towards other ones of the controllers via the internal communication path. The storage control system further comprises means for monitoring an operational state of each of the controllers based on the operational information sent from the sending means of the controllers. The controllers mutually monitor the operational state of the other controllers via the internal communication path and via the monitoring means.

According to one aspect of the present invention, a structure is realized in which the operational information is notified through the internal communication path, which is for carrying out command of data input/output and carrying out input/output of data, such as for example a control bus formed on a circuit board and connecting a CPU and a memory, and which generally has a higher reliability than an external communication path and is capable of realizing high-speed, large capacity communication. Accordingly, the number of components of the storage control system may be decreased, and it becomes possible to realize a highly reliable system while reducing the cost of the device.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 2 is a diagram showing an operational-state management table according to one example of the present invention;

FIG. 10 is a diagram showing an operational-state management table according to one example of the present invention.

DETAILED DESCRIPTION OF THE INVENTION

Figure 1:
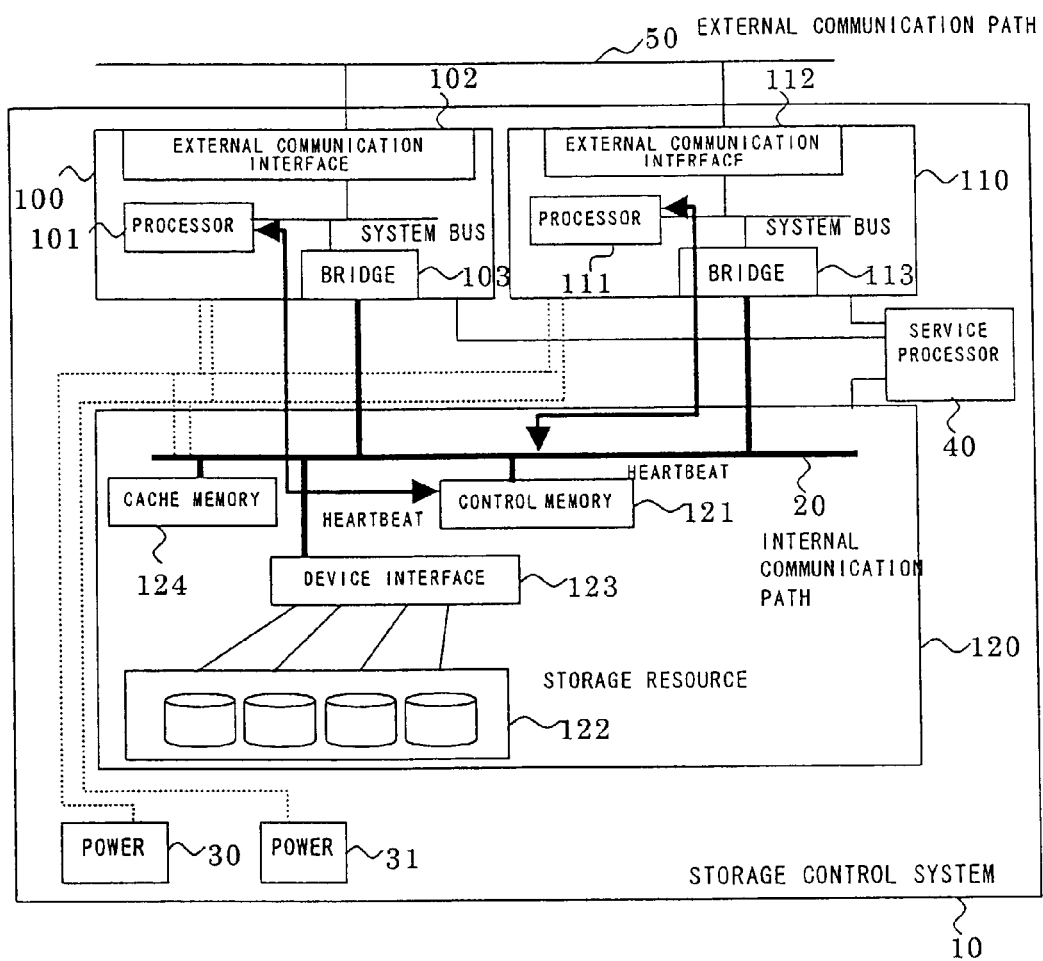
FIG. 1 is a diagram showing a structure of a storage control system according to one example of the present invention.

At least the following matters will be made clear by the explanation in the present specification and the description of the accompanying drawings.

===Some Aspects of the Disclosure===

One example of the present invention is a storage control system comprising: a plurality of controllers, each of the controllers receiving a data-input/output request inputted via an external communication path and sending a data-input/output command to storage means; and an internal communication path through which the controllers carry out the data-input/output command and data input/output, each of the controllers comprising means for sending its own operational information towards other ones of the controllers via the internal communication path, and the storage control system further comprising means for monitoring an operational state of each of the controllers based on the operational information sent from the sending means of the controllers.

According to such a storage control system, the operational information (for example, heartbeat messages) is notified through the internal communication path, which is for carrying out command of data input/output and carrying out input/output of data, such as a control bus formed on a circuit board and connecting a CPU and a memory. Accordingly, the number of components of the storage control system may be decreased, and it becomes possible to realize a highly reliable system while reducing the cost of the device.

According to another example of the present invention, a storage control system comprises: a plurality of controllers, each of the controllers receiving a data-input/output request inputted via an external communication path and sending a data-input/output command to storage means; and an internal communication path connected to the storage means and through which the controllers carry out the data-input/output command and data input/output, each of the controllers comprising means for sending its own operational information via the internal communication path towards a memory connected to the internal communication path, the storage control system further comprising means for recording, on the memory, the operational information, and each of the controllers further comprising means for accessing the memory via the internal communication path and monitoring an operational state of other ones of the controllers based on the operational information recorded on the memory.

According to a storage control system configured as above, it is possible to manage failure states in the operational information (for example, in an "operational-state management table" as explained below) existing in the memory (for example, in a control memory as explained below) independent of the controllers. Thus, it will become possible to further specify the cause of failure and/or the part having failed by combining the above-mentioned operational information with other information such as information regarding the operational state of the internal communication path.

Further, according to the storage control system, it may be possible to configure the controller to comprise, for example, a central processing unit, an external communication interface for connecting to the external communication path, and an internal communication interface for connecting to the internal communication path.

Further, in the storage control system, the operational information may include information indicative of whether or not any of the controller has failed; and the storage control system may comprise means for making at least one of the controllers take over processing carried out by a failed one of the controllers if the monitoring means acknowledges that there is failure in the failed controller. Accordingly, the availability of the storage control system will be ensured.

Further, the storage control system may be structured so that the memory comprises means for storing resource information relating to processing taken charge of by each of the controllers; and the controller which is to take over the processing comprises means for accessing the resource information and acknowledging the processing that the controller is to take over.

Further, the storage control system may be structured so that the resource information includes, for example, information required by the controllers for communication via the external communication path or the internal communication path, storage-area designating information which is designated in the data-input/output command, and/or a network address of each of the controllers used for communication by the external communication path.

Further, the storage control system may be structured so that the operational information includes information indicative of whether failure has occurred in either of the central processing unit, the external communication interface, or the internal communication interface.

Further, an example of a storage control system may be such that the information indicative of failure is a timestamp sent at predetermined intervals from each of the controllers to the memory via the internal communication path and recorded on the memory in correspondence with each of the controllers; and if the timestamp corresponding to one of the controllers is not updated for a predetermined period of time or longer, the monitoring means acknowledges that the one controller corresponding to the timestamp has failed.

Further the storage control system may be structured so that the monitoring means comprises means for determining that, if the operational information cannot be accessed, the internal communication path has failed.

Further the storage control system may be structured so that the monitoring means comprises means for determining that, if the operational information can be accessed but a timestamp of one of the controllers has not been updated for a predetermined period of time or longer, the controller corresponding to the timestamp has failed. Accordingly, it becomes possible to further specify a failure.

Further, the storage control system may be structured so that the storage means comprises: a central processing unit; the memory; and a device interface for carrying out data input/output in view of a storage resource such as a disk drive. Further, the storage control system may be structured so that the operational information or resource information is recorded on the memory.

Further, the storage control system may be structured so that the operational information or resource information is recorded on the storage resource.

Further, the storage control system may be structured so that each of the controllers comprises: a file system for carrying out a data-input/output request on a file-name basis; and means for sending the data-input/output command to the storage means per unit of data designated by the file name. Such a structure may be applied in a case where the storage control system is used, for example, as a NAS server.

Further, an example of a storage control system may be such that each of the controllers comprises: a device interface for controlling data input/output in view of a storage resource such as a hard disk; a cache memory; and means for carrying out read/write of data to/from the storage resource via the cache memory. Further, the storage control system may be structured so that the internal communication is configured in a redundant manner by a plurality of communication paths.

Further, the storage control system may be structured so that each of the controllers comprises: means for sending its own operational information towards other ones of the controllers via another communication path (for example, a private communication line described later), the other communication path being provided separate from the internal communication path and connecting between the controllers; and means (for example, emulation drivers described later) for sending the operational information intended to be sent via the other communication path to the internal communication path.

According to such a structure, it becomes possible to realize a mechanism for easily and inexpensively monitoring operational states by using, for example, a general-purpose cluster software.

Further, one example of a method of controlling a storage control system, which comprises a plurality of controllers, each of the controllers receiving a data-input/output request inputted via an external communication path and sending a data-input/output command to storage means; and an internal communication path through which the controllers carry out the data input/output command and data input/output, may be such that the method comprises the steps of: each of the controllers sending its own operational information towards other ones of the controllers via the internal communication path; and the controllers mutually monitoring an operational state of the other controllers based on the operational information.

Further, as another example of a method of controlling a storage control system, which comprises a plurality of controllers, each of the controllers receiving a data-input/ output request inputted via an external communication path and sending a data-input/output command to storage means; and an internal communication path connected to the storage means and through which the controllers carry out the data input/output command and data input/output, may be such that the method comprises the steps of: each of the controllers sending its own operational information via the internal communication path towards a memory connected to the internal communication path; the storage control system recording, on the memory, the operational information; and each of the controllers accessing the memory via the internal communication path, and monitoring an operational state of other ones of the controllers based on the operational information recorded on the memory.

According to such a structure, a storage control system of the present invention will be able to efficiently manage the operational information by using the internal communication path as a communication path for exchanging the operational information between the controllers. Further, it will be possible to provide a high-performance, highly-reliable, and easy to configure function for monitoring operational information at low costs.

===First Embodiment===

<Device Configuration>

Firstly, explanation will be made of an example in which one aspect of the present invention has been applied to the above-mentioned storage control system 10 shown in FIG. 1.

The storage control system 10 comprises: an internal communication path 20 which is for carrying out data-input/ output commanding and carrying out input/output of data, alike, for example, a control bus (or a system bus) formed on a circuit board and connecting a CPU and a memory; a plurality of controllers 100, 110 connected to the internal communication path 20; a storage apparatus 120; and power units 30, 31 structured in a redundant manner. A service processor 40 connected to the controllers 100, 110 and the storage apparatus 120 carries out, for example, operation control of the controllers 100, 110 and the storage apparatus 120, various settings thereto, and/or monitoring of their operational states.

The controllers 100, 110 respectively comprise: a processor 101, 111 as a central processing unit structured, for example, by a CPU; an external communication interface 102, 112 for connecting to an external communication path 50 such as a LAN; and an internal communication interface 103, 113 structured, for example, by a bridge connecting to the internal communication path 20.

A file system (not shown) operates respectively in the controllers 100, 110, and the controllers 100, 110 handle data-input/output requests designating file names from the external communication path 50. That is, the controllers 100, 110 respectively comprise a function as a computer that works as a file server on the LAN, and the storage control system 10 functions as the above-mentioned NAS server.

The storage apparatus 120 comprises, for example: a control memory 121 on which information such as system-management information is recorded; storage resource 122 such as hard disks; a device interface 123 which carries out read/write of data to/from the storage resource 122 according to commands sent from the controllers 100, 110; and a cache memory 124.

Note that the storage resource 122 may be installed within the storage control system 10 as shown in FIG. 1, or can be in an independent housing outside of the storage control system 10 and be connected to the device interface 123 through an appropriate interface.

<Basic Operation>

Explanation will be made of basic operations of the storage control system 10. When the storage control system 10 receives a data-input/output request inputted from an external device such as a host computer (not shown) via the external communication path 50, the processors 101 and/or 111 send, to the control memory 121 via the internal communication path 20, a data-input/output command including an instruction command corresponding to the received request and data. The control memory 121 receives and stores this command.

For example, if the above-mentioned instruction command included in the above-mentioned data-input/output command is a write command, the device interface 123 sends a send-data request to the processors 101, 111 via the internal communication path 20. Having received the send-data request, the processors 101, 111 stores write data (i.e., data to be written) to the cache memory 124, and sends an interrupt request to the device interface 123. Having received the interrupt request, the device interface 123 writes-in, to the storage resource 122, the above-mentioned write data stored in the cache memory 124 at an appropriate timing.

On the other hand, if the above-mentioned instruction command is a read command, the data interface 123 reads-out data stored in a storage region of the storage resource 122 designated by information attached to the instruction command, stores the read-out data in the cache memory 124, and sends the read-out data to the processors 101, 111 via the internal communication path 20.

The device interface 123 having received the interrupt request refers to the above-mentioned instruction command stored in the control memory 121, and transfers the data stored in the cache memory 124 and redundant data to the storage resource 122.

<Monitoring Function>

Each of the controllers 100, 110 mutually monitor whether any failure has occurred or not in the other one of the controllers 110, 100. For example, an operator may set, via the service processor 40, which of the processors 100, 110 is to monitor the other processors 100, 110. The setting information is registered to items 251, 254 headed "monitoring object of controller" in an operational-state management table existing in the control memory 121, as shown in FIG. 2.

Each of the controllers 100, 110 monitors the operational states of the other one of the controllers 100, 110 which is assigned as an object of monitoring. If the controller 100, 110 detects some kind of failure in the other controller 100, 110 which it monitors, the controller 100, 110 carries out a process according to the details of the detected failure.

Figure 3:
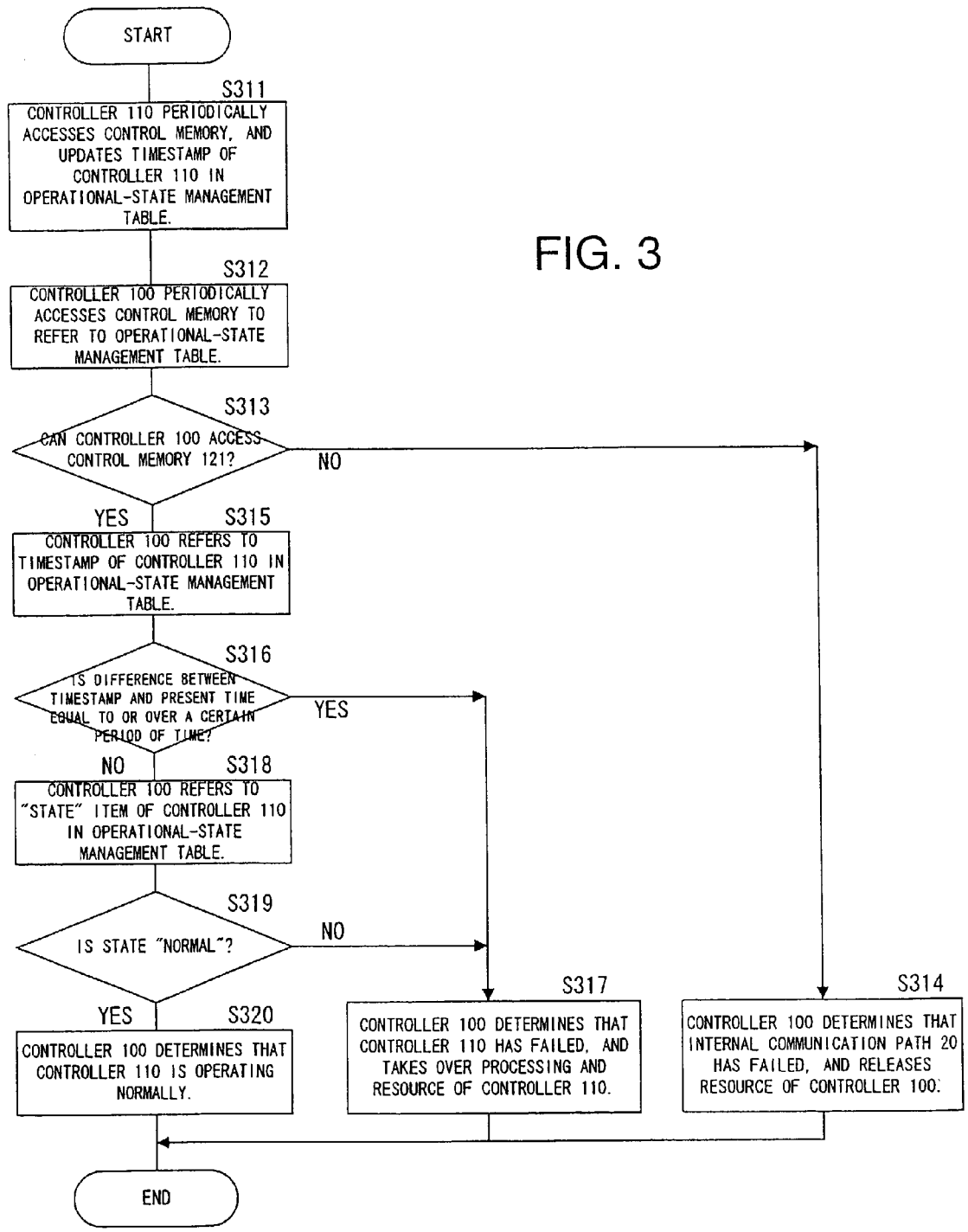
FIG. 3 is a flowchart for explaining a process wherein one controller detects another controller in a storage control system for explaining one example of the present invention.

Below, with reference to the flowchart of FIG. 3, explanation will be made of a monitoring function of the controllers 100, 110 and a function of the storage control system 10 carried out upon detection of disorder. This explanation is of an example in which the controller 100 detects failure of the controller 110.

The controller 110 accesses the control memory 121 periodically (the timing can be arbitrarily changed) via the internal communication path 20 (or, sends heartbeat messages). Upon accessing, the controller 110 writes, as a timestamp, the time of access in item 255 headed "timestamp" for the controller 110 in the operational-state management table (S311). That is, if there is no disorder in the controller 110, the timestamp will periodically be updated.

On the other hand, the controller 100 accesses the control memory 121 via the internal communication path 20 periodically (or at an arbitrary timing other than a periodic timing) in order to refer to the operational-state management table (S312).

If the controller 100 cannot access the control memory 121 (S313), the controller 100 will determine that there is some kind of failure in the internal communication path 20. In case failure has occurred in the internal communication path 20, there is a possibility in that data input/output to/from the storage apparatus 120 cannot be properly performed. Thus, the controller 100 may, for example, stop the data-input/output processes to the storage apparatus 120 carried out by the controller 100 itself, and release resource obtained by the controller 100 in relation to the input/output process (S314).

The above-mentioned "resource" may be, for example: information such as a network address (for example, IP address) necessary for communication by the controllers 100, 110 with the external communication path 50 or the internal communication path 20; and storage-region designation information (for example, information relating to a storage region mounted by the controller 110) designated by the data-input/output command sent to the storage means from the controllers 100, 110.

On the other hand, if the controller 100 can access the control memory 121, the controller 100 refers to the timestamp 255 of the controller 110 in the operational-state management table (S315), and checks to see whether a difference between the time upon access and the timestamp is within or exceeding a predetermined period of time (S316).

If the difference is equal to or over a predetermined period of time, the controller 100 determines that a failure has occurred in the controller 110, and takes over the processes and resources currently taken charge of by (or in other words, assigned to) the controller 110 (S317).

On the other hand, if the difference is within the predetermined period of time, the controller 100 refers to the contents of item 256 headed "state" for the controller 110, which is the object of monitoring, in the operational-state management table (S318). If the contents indicate "normal", the controller 100 acknowledges that the controller 110 is operating in a normal state (S319, S320). If the contents of the "state" item 256 indicates "disorder", the controller 100 determines that the controller 110 has failed, and takes over the processes taken charge of by the controller 110, in the same way as explained above (S319, S317). Note that the "normal" and "disorder" indications in the operational-state management table are written in an appropriate format such as bitmap representation.

Figure 4:
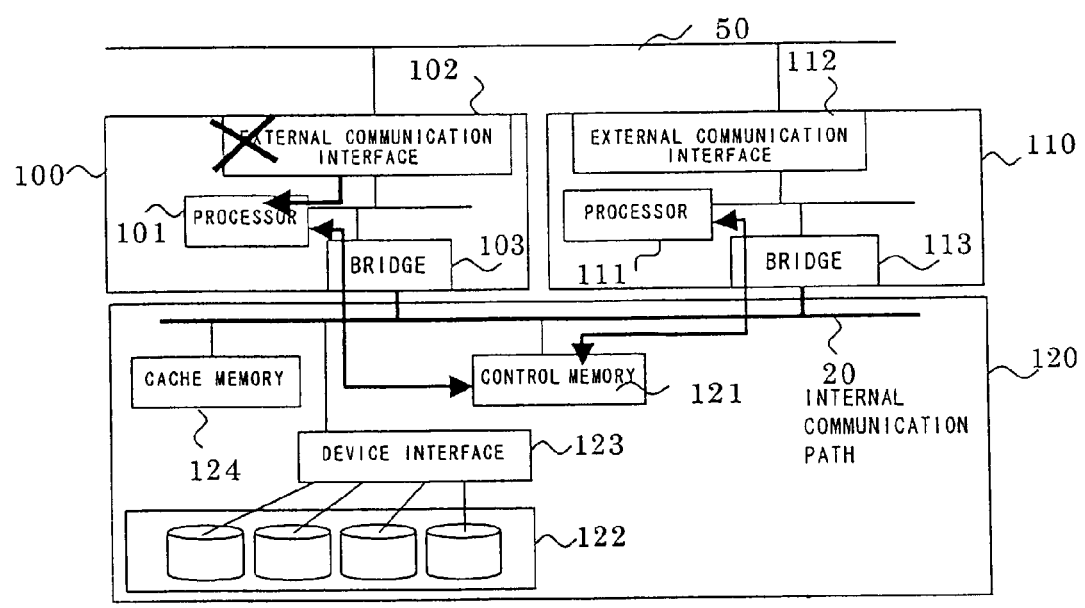
FIG. 4 is a diagram mainly explaining a process for acknowledging failure in a case where an external communication interface has failed in a storage control system for explaining one example of the present invention.

By the way, in the storage control system 10, the contents of the "state" item in the operational-state management table is managed as follows. For example, if there is failure in the external communication interface 102 as shown in FIG. 4, the controllers 100, 110 acknowledge such a failure through direct report of the failure to the processors 101, 111 from the external communication interface 102, 112, or, by timeout of a processing instruction sent to the external communication interface 102.

When the controllers 100, 110 acknowledge that there is failure in the external communication interface 102, the controllers 100, 110 access the operational-state management table in the control memory 121 via the internal communication path 20, and write-in "disorder" in the "state" item 253, 256 corresponding to the controller 100, 110 which has failed.

Figure 5:
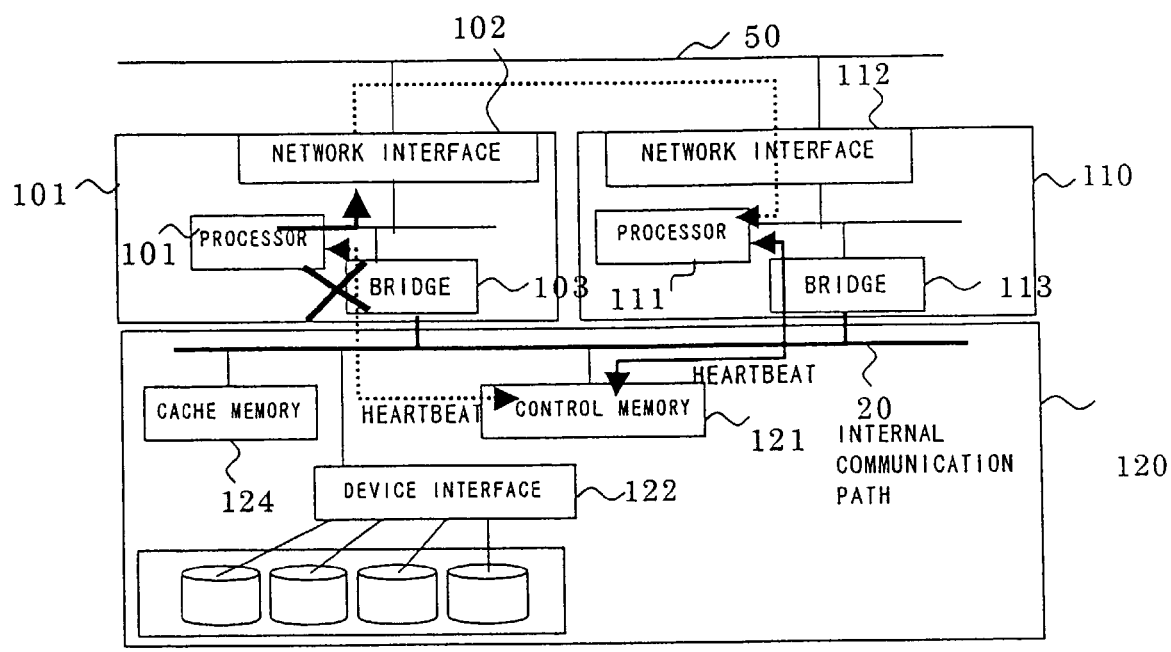
FIG. 5 is a diagram mainly explaining a process for acknowledging failure in a case where an internal communication interface has failed in a storage control system for explaining one example of the present invention.

On the other hand, for example, if there is failure in the internal communication interfaces 103, 113 as shown in FIG. 5, the controllers 100, 110 acknowledge such a failure by a report of the failure to the processors 101, 111 from the internal communication interface 103, 113, or, by timeout of a processing instruction sent to the internal communication interface 103, 113.

The controllers 100, 110 can mutually judge the state of the other one of the controllers 110, 100 by monitoring the timestamp of the operational-state management table in the control memory 121. When the controllers 100, 110 acknowledge that there is failure in the internal communication interfaces 113, 103 of the other one of the controllers 110, 100, the controllers 100, 110 may access the operational-state management table in the control memory 121 via the internal communication path 20, and may write-in "disorder" in the "state" item 253, 256 corresponding to the controller 100, 110 which has failed.

Figure 6:
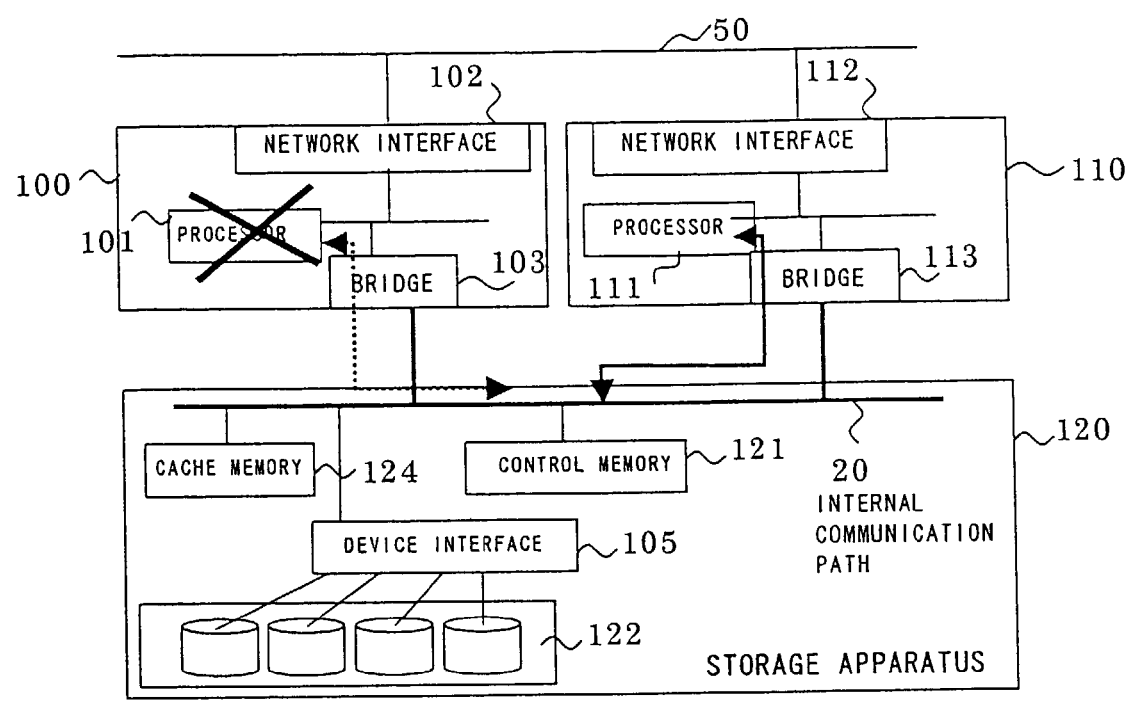
FIG. 6 is a diagram mainly explaining a process for acknowledging failure in a case where a processor has failed in a storage control system for explaining one example of the present invention.

FIG. 6 shows a case where the processor 101 has failed. In this case, the controller 100 cannot write-in this state to the operational-state management table. However, since the processor 111 of the controller 110 refers to the control memory 121, the controller 110 can detect this failure even if the processor 101 has failed.

In the above example, explanation has been made of a case in which the controller 100 monitors the controller 110. However, needless to say, the same processes are carried out when the controller 110 monitors the controller 100.

Further, in the above examples, communication for failure monitoring of the controllers 100, 110, such as write-in and reference to the operational-state management table in the control memory 121, is carried out via the internal communication path 20. Therefore, communication for failure monitoring can be performed at high speed compared to conventional methods using the external communication path 50 or a private communication path. Further, since the internal communication path 20 is generally superior in transmission ability and reliability compared to the external communication path 50 such as the LAN, communication for failure monitoring can be carried out promptly and reliably.

Furthermore, the internal communication path 20, which is originally provided such as for data-input/output processes between the controllers 100, 110 and/or between the controllers 100, 110 and the storage apparatus 120, is also used for failure-monitoring communication. Therefore, there is no need to add excessive hardware such as a private communication path, and thus, a communication mechanism for failure monitoring can be configured easily at low costs.

Further, in the above examples, the state of failure is managed by the operational-state management table existing in the control memory 121 of the storage apparatus 120 which is independent of the controllers 100, 110 and which connects to the controllers 100, 110 via the internal communication path 20. Therefore, by combining the failure-state information with information regarding operational states of the internal communication path 20, it becomes possible to specify the cause of failure and/or the part having failed in a more detailed manner.

Furthermore, in the above examples, the control memory 121 also manages information regarding the resources obtained by each of the controllers 100, 110, which information being used for handing over the processes to the surviving controller 100, 110 when either one of the controllers 100, 110 detects occurrence of failure. Therefore, the storage apparatus 120 can confirm the resources to be handed over even if the controllers 100, 110 fail. Furthermore, by centralized and unified management of the resources, it is possible to realize, for example, reduction in management load.

Further, if the internal communication path is configured in a redundant manner, it may become possible to further ensure safety and reliability of communication for failure monitoring.

Note that, although only two controllers are present in the above example, the system is not to be limited to such a structure, and the system may easily be expanded to a structure in which three or more controllers are present.

===Using Existing Cluster System===

As described in the above-mentioned publications, there conventionally exists software which carries out communication for failure monitoring between computers using an external communication path and/or a private communication path. Below, explanation will be made of an example for realizing a mechanism according to one aspect of the present invention using an internal communication path in a failure-monitoring communication using such a software.

Figure 7:
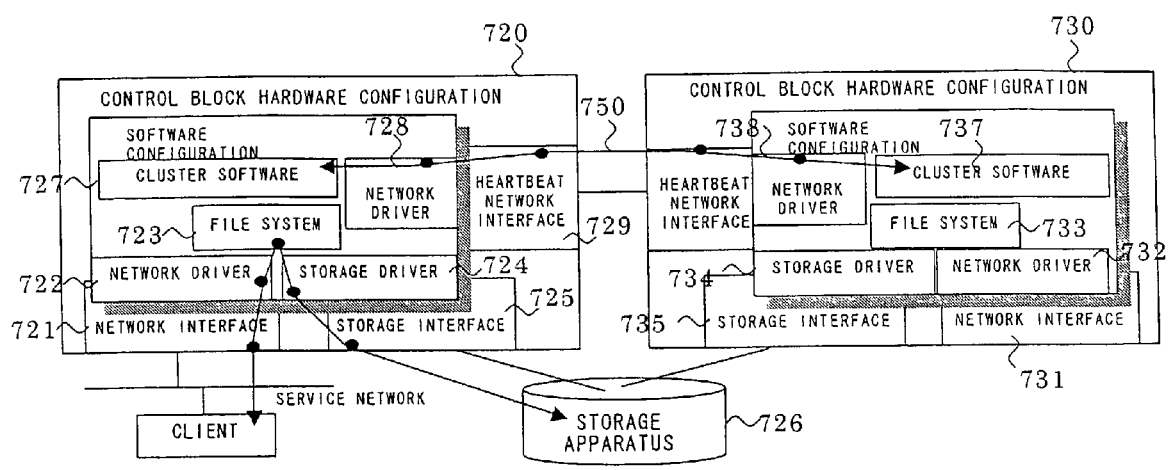
FIG. 7 is a diagram explaining a conventional mechanism in which computers mutually monitor their operational states.

FIG. 7 shows a conventional system configuration in which computers 720, 730, corresponding to the controllers of the present invention, are connected via a private communication path 750, and the computers 720, 730 mutually monitor their operational states by transmitting heartbeat messages via the private communication path 750.

The computers 720, 730 respectively receive requests for file service from clients with their respective file systems 723, 733, via network interfaces 721, 731 and network drivers 722, 732.

The file systems 723, 733 carry out data transfer to/from a storage apparatus 726 via respective storage drivers 724, 734 and respective storage interfaces 725, 735 when data transfer to the storage apparatus 726 is necessary. Cluster software 727, 737 sends heartbeat messages to the corresponding cluster software 727, 737 of the corresponding computers 720, 730 via the respective heartbeat network drivers 728, 738 and the heartbeat network interfaces 729, 739.

Figure 8:
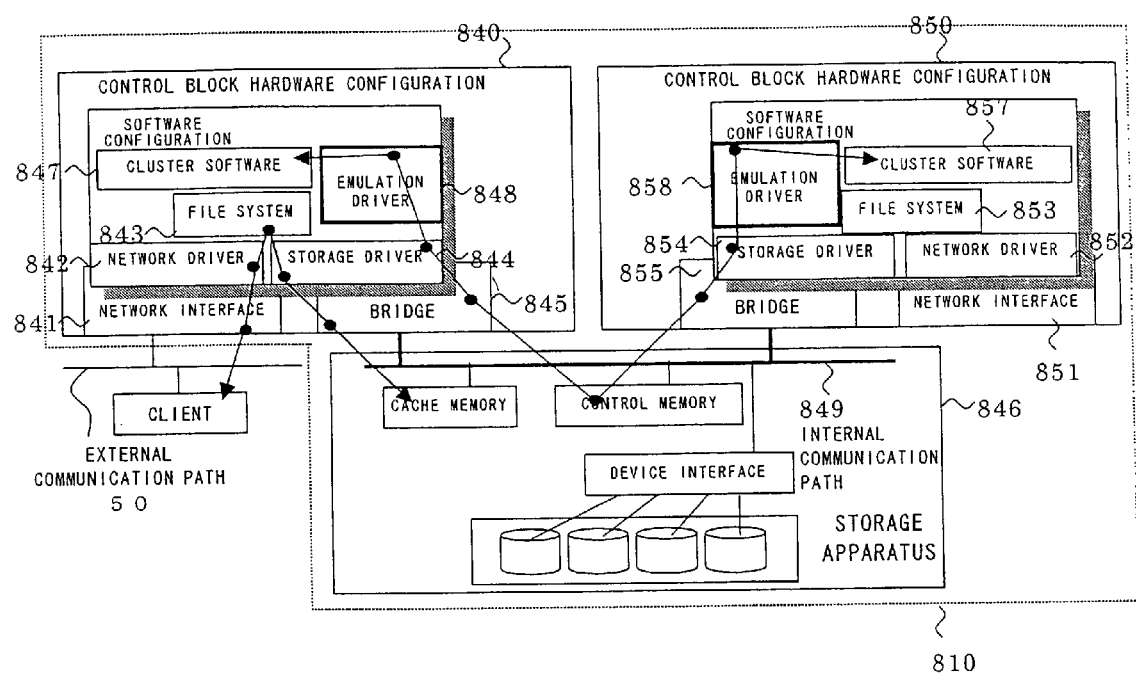
FIG. 8 is a diagram showing a structure of a storage control system using an internal communication path for failure monitoring according to one example of the present invention.

FIG. 8 shows an example of applying one aspect of the present invention, which uses an internal communication path for failure monitoring, to the configuration shown in FIG. 7 which employs the above-mentioned cluster software 727, 737. In this figure, a storage control system 810 comprises emulation drivers 848, 858 which accept access from the cluster software 847, 857, and convert the access from the cluster software to an access to respective storage drivers 844, 854. According to such a structure, the heartbeat messages sent by the general-purpose cluster software 847, 857 can be converted into operational-state information transmitted through an internal communication path 849, and vice versa.

Specifically, for example, the emulation drivers 848, 858 have functions such as: accepting access from the cluster software 847, 857 through communication complying with transmission procedures of other communication paths such as RS-232C or a LAN and converting such access into transmission over the internal communication path 849, and also, converting the transmission over the internal communication path 849 to comply with transmission procedures for the above-mentioned other communication paths and transferring the transmission to the cluster software 847, 857 according to the transmission procedures. Note that the storage control system 810 may actually comprise the other communication paths, such as RS-232C and/or the LAN, in forms of hardware and/or software, but does not necessarily have to comprise them. Further, the above-mentioned section having the conversion function does not have to be provided within the emulation drivers 848, 858, but may be provided in firmware (not shown) providing functions of the storage drivers 844, 854 and/or an internal communication interface (not shown) of a storage apparatus 846.

As explained above, in systems to which cluster software is already installed, the present invention may be implemented simply by installing the emulation drivers.

Further, if no cluster software is installed, by combining the emulation driver to an existing cluster software and installing the software to a system, the present invention may be implemented at low costs because it becomes possible to reduce costs for developing functional sections of the cluster software.

===Other Configuration of Internal Communication Path===

Explanation will be made of examples in which the internal communication path is not a control bus, but is configured of communication paths based on other protocols such as Fibre Channel, Intelligent I/O, Rapid I/O and so forth.

Figure 9:
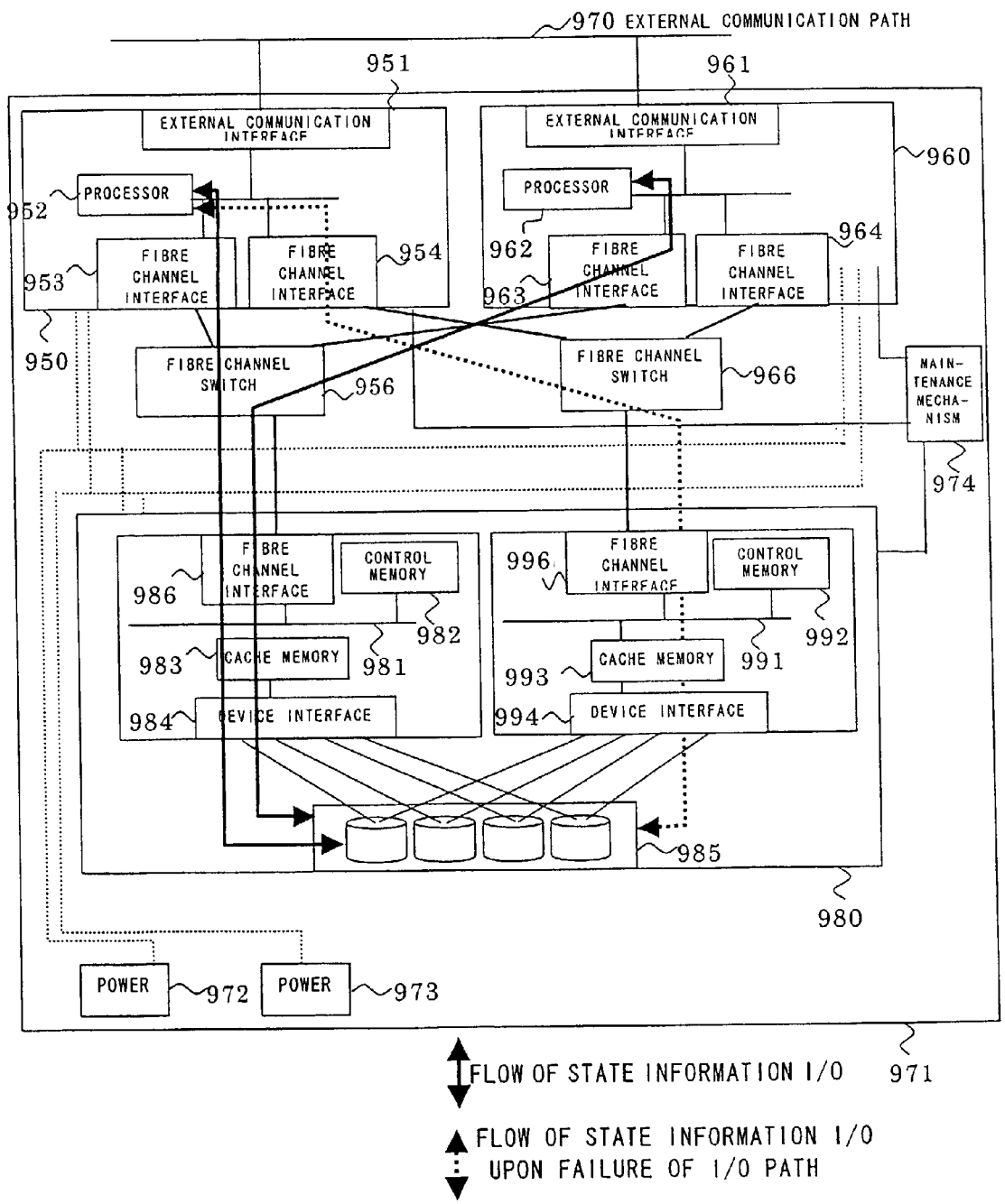
FIG. 9 is a diagram showing a structure of a storage control system in which the internal communication path is structured by a communication path according to Fibre Channel protocol.

FIG. 9 is a diagram showing a configuration of a storage control system 971 in which the internal communication path is configured of a communication path according to Fibre Channel protocol. Controllers 950, 960 respectively comprise Fibre Channel interfaces 953, 963 as internal communication interfaces.

A storage apparatus 980 also comprises Fibre Channel interfaces 986, 996, and connects to the controllers 950, 960 via Fibre Channel switches 956, 966 and the Fibre Channel interfaces 986, 996.

The controllers 950, 960 mutually connect to the controllers 950, 960 via the Fibre Channel switches 956, 966 and the Fibre Channel interfaces 953, 963, and respectively comprise control memories 982, 992 and cache memories 983, 993 for temporarily buffering write data and read-out data having been read out from a disk drive.

The controllers 950, 960 are connected to a disk drive group 985 via respective device interfaces 984, 994. The controllers 950, 960 and the storage apparatus 980 are fed by redundantly-configured power sources 972, 973 which are installed within the same housing of the storage control system 971, and various operational settings and/or operational management of the controllers 950, 960 and the storage apparatus 980 are carried out by a maintenance mechanism 974.

Flow of control and data will be explained with reference to an example in which the controller 950 transfers WRITE data to a storage resource 985 comprising a group of disk drives.

When the controller 950 receives a request for data service from a service network 970, a processor 952 converts the service request into an I/O command to the storage apparatus 980, and sends the I/O command to the storage apparatus 980 via the Fibre Channel interface 953, the Fibre Channel switch 956, and the Fibre Channel interface 986.

The I/O command sent to the storage apparatus 980 is stored in the control memory 982. If the I/O command is a write command, the Fibre Channel interface 986 instructs the processor 952 to transfer data. According to this instruction, the processor 952 sends write data to the storage apparatus 980 according to the Fibre Channel protocol. The storage apparatus 980 receives the write data having been sent, and temporarily stores the data in the cache memory 983. The write data is transferred to the storage resource 985 by the device interface 984, along with redundant data.

Next, explanation will be made of a mechanism in the storage control system 971 wherein, in the system shown in FIG. 9, the operation of the storage control system 971, such as data service, can automatically be continued by making the controller 960 take over resource of the controller 950 when the controller 950 fails, and making the controller 950 take over resource of the controller 960 when the controller 960 fails.

The storage resource 985 stores an operational-state management table as shown in FIG. 10. The operational-state management table comprises items such as information 1001, 1002 for specifying each of the controllers, and information 1003, 1004 for specifying the controller to be monitored.

These items are set, for example, according to a failover policy. Timestamps 1005, 1006 indicate the time of the respective controllers 950, 960 when the controllers 950, 960 issue an I/O of operational information (or a heartbeat message). To the items 1007, 1008 headed "state" in the operational-state management table, there is set information indicating "normal" and/or "disorder" state of the controllers 950, 960. If necessary, characteristic identifiers, such as names assigned to the controller on the service network 970 upon configuring a cluster system, may be used for the information set to these items.

The processor 952 of the controller 950 sends a read-out command to read the operational-state management table in the storage resource 985 at an appropriate timing (for example, periodically), and obtains all or a part of the data indicated in the operational-state management table. When the processor 952 reads the operational-state management table, the processor 952 refers to the "controller name" region 1001, 1002 among the overall data, and refers to the controller name listed in the "controller to be monitored" corresponding to the controller name "Server A", which is the name of controller 950. In this example, "Server B" is assigned to the "Server A" as the controller which is to be monitored. Thus, the processor 952 refers to the timestamp 1006 and "state" information 1008 of the "Server B", and determines whether it is necessary to carry out a failover process or not.

If a difference between the timestamp 1006 of the "Server B" and the current time is equal to or over a predetermined period of time, or, if information indicating a "disorder" state is set to the "state" item 1008, the processor 952 acknowledges that there is some kind of failure in the controller 960. Further, since the processor 952 can access the operational-state management table, the processor 952 acknowledges that there is no failure in the internal communication path and that the failure is of the controller 960, and starts to take over the processes carried out by the controller 960 and the resources thereof.

Note that the processor 952 updates the contents of the items 1005, 1007 in FIG. 10, which indicate the timestamp and the state information of the "Server A" at an appropriate timing (for example, periodically), regardless of whether the processor 952 detects failure in the controller 960 or not. The controllers 950, 960 carry out the above-mentioned processes periodically to realize a mechanism such as for failure monitoring using a general-purpose I/O interface as a communication path.

Next, explanation will be made of an operation of the storage control system when failure occurs in the Fibre Channel switch 956.

If the Fibre Channel switch 956 fails, the controller 950 will not be able to carry out input/output. However, if the controller 960 continues processing according to the normal failover mode, processing will concentrate on the controller 960 and the overall performance may deteriorate.

Therefore, in such a case, I/O is continued by changing the input/output path for the controller 950 from a normal path passing through the Fibre Channel interface 953→the Fibre Channel switch 956→the Fibre Channel interface 986 to a different path passing through the Fibre Channel interface 954→the Fibre Channel switch 966→the Fibre Channel interface 996, through the use of, for example, a general-purpose I/O switching software. Further, at this time, the path through which the controller 950 carried out I/O to/from the disk volume group 985 for storing and acknowledging access-state information of the controller 950 will also be switched.

In this example, the controller 950 stores, to the disk volume group 985, the timestamp 1005 and the contents 1007 of the "state" item of the controller 950 in FIG. 10 via the Fibre Channel interface 954→the Fibre Channel switch 966→the Fibre Channel 996.

Above, an example has been explained in which the Fibre Channel switch 956 has failed. However, the above-mentioned process can be extensively used for cases where failure occurs in, for example, the Fibre Channel interface 953, the Fibre Channel switch 966, or the Fibre Channel interface 986.

Further, it is possible to store, in the disk drive for storing the operational states of the controllers, network attributes such as a network addresses of the controllers which would be necessary for clustered operation, and information regarding take over of resources, such as information of the disk drives in which data is stored. According to such a structure, since the controllers will be able to read out such information stored in the disk drive, it becomes possible to unify management of settings for resource take over, and realize further reduction of management costs.

FIG. 9 shows a configuration including two Fibre Channel switches 956, 966. However, the present invention may be extensively applied to structures where no Fibre Channel switches are included and/or structures where three or more Fibre Channel switches are included. Further, the present invention may be applied to cases using general-purpose I/O interfaces other than Fibre Channel.

As explained above, according to the present example, transmission of the operational information which includes the state information of the controllers 950, 960 is carried out across the general-purpose I/O interface to the storage apparatus 980, and not across the external communication path or a private communication path. Thus, there is no need to introduce a network interface for heartbeats, thereby realizing reduction in costs and labor. Further, by using the highly-reliable general-purpose I/O interface, it is possible to realize a highly-reliable function for monitoring the operational states.

===Method of Storing Operational Information===

Next, explanation will be made of an example for storing operational information sent from a general-purpose cluster software in a storage resource (for example, a disk drive), such as disk drives of a storage apparatus, upon configuring a system according to one aspect of the present invention using a general-purpose cluster software.

Figure 11:
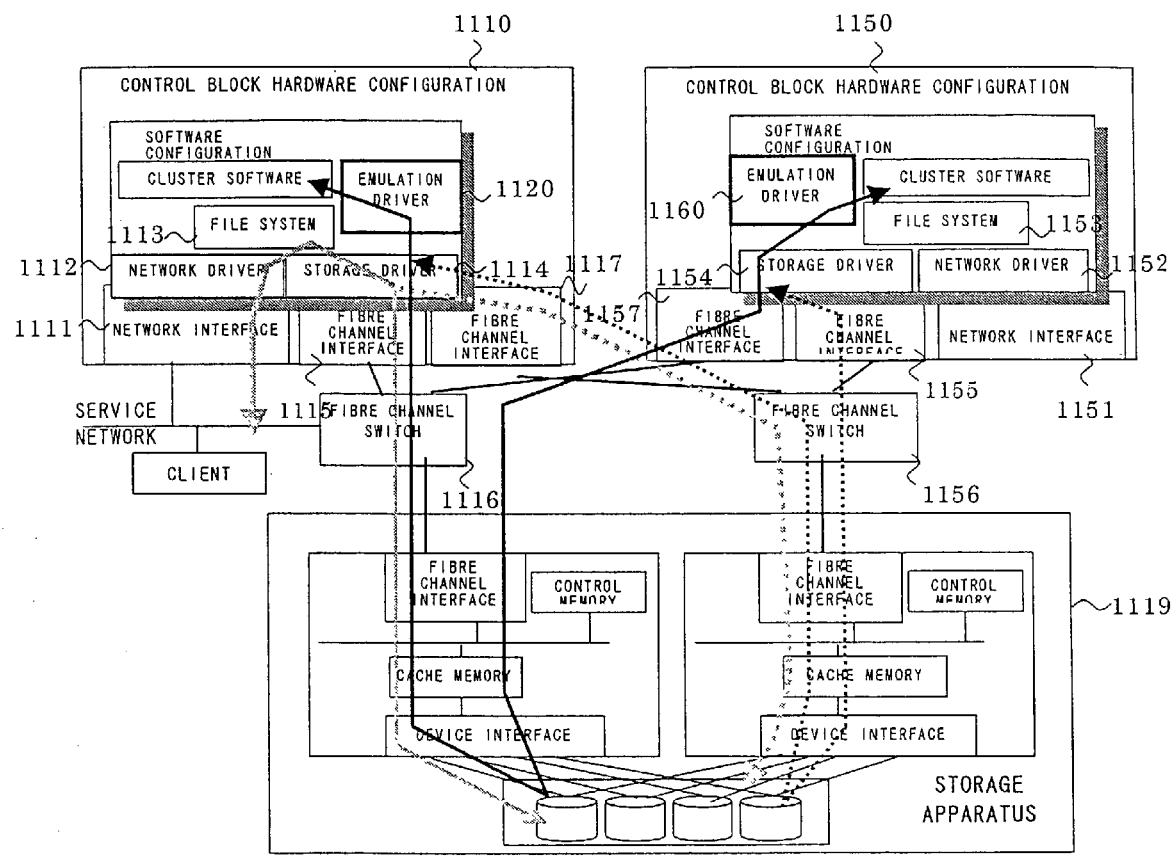
FIG. 11 is a diagram showing a structure of a storage control system according to one example of the present invention, using a general-purpose cluster software and wherein operational information is stored in a storage resource such as disk drives.

FIG. 11 shows an example of a storage control system 1000 structured as above. Controllers 1110, 1150 respectively receive, with their file systems 1113, 1153, file-service requests from clients via respective network interfaces 1111, 1151 and network drivers 1112, 1152. The file systems 1113, 1153 respectively carry out data transfer with a storage apparatus 1119 via respective storage drivers 1114, 1154, Fibre Channel interfaces 1115, 1155 and Fibre Channel switches 1116, 1156. A general-purpose I/O switching software is incorporated in the storage drivers 1114, 1154.

If the data-transfer path fails, the storage drivers 1114, 1154 will switch the path for data transfer to a path passing through Fibre Channel interfaces 1117, 1157 and the Fibre Channel switches 1116, 1156.

In the present system, the general-purpose cluster software sends operational information, including information regarding states of the controllers, to the network. Further, it is possible to make emulation drivers 1120, 1160 operate in each of the controllers 1110, 1150. These emulation drivers 1120, 1160 receive requests for the above-mentioned operational information as network drivers and also convert the requests into requests for carrying out data transfer to the storage apparatus 1119 via general-use I/O interfaces. According to such a structure, it is possible to exchange heartbeats with the general-purpose cluster software transparently via the general-use I/O interfaces.

Further, even if the I/Os are heartbeats over the general-use I/O interfaces, in case the data-transfer path fails, the storage drivers 1114, 1154 will switch the data-transfer path to a path via the Fibre Channel interfaces 1117, 1157 and the Fibre Channel switches 1116, 1156, and continue data transferring. Accordingly, a high-performance mechanism for monitoring operational states will be realized.

Although the preferred embodiment of the present invention has been described in detail, it should be understood that various changes, substitutions and alterations can be made therein without departing from spirit and scope of the inventions as defined by the appended claims.

What is claimed is:

1. A storage control system comprising:
   a plurality of controllers configured to be coupled to an external communication path and operative to service file-level I/O requests from a host device over said external communication path;
   a storage apparatus having a disk drive and a device interface that executes writing and reading data into and from said disk drive; and an internal communication path configured for connection among said controllers and said device interface, each controller further being operative to monitor an operational state of other controllers via said internal communication path, each controller further being operative to communicate a data input/output command corresponding to said file-level I/O requests to said device interface via said internal communication path, said device interface being operative to execute writing or reading of data into or from said disk drive according to said data input/output commands, wherein said operational state includes information indicative of whether or not a corresponding one of said controllers has failed, said storage control system further comprising a section that makes at least one of the others of said controllers take over processing being carried out by a failed controller if at least one of the others of said controllers acknowledges that here is failure in said failed controller, wherein said controller determines that said internal communication path has failed, if said operational state of other said controllers cannot be accessed, wherein if said controller determines that said internal communication path has failed due to not being able to access said operation state, then said controller stops data I/O processing to said internal communication path.

2. A storage control system according to claim 1, wherein said file-level I/O requests each includes a file identifier.

3. A storage control system according to claim 1, wherein each said controller comprises:

a central processing unit;

an external communication interface for connecting to said external communication path, and an internal communication interface for connecting to said internal communication path.

4. A storage control system according to claim 3, wherein said operational information includes information indicative of whether failure has occurred in any one of said central processing unit, said external communication path, and said internal communication path.

5. A storage control system according to claim 4, wherein said information indicative of failure is a timestamp sent at predetermined intervals from a corresponding one of said controllers to said memory via said internal communication path and stored in said memory so as to be associated with said controller; and if said timestamp corresponding to one of said controllers has not been updated for a predetermined period of time or longer, said monitor acknowledges that said one controller corresponding to said timestamp has failed.

6. A storage control system according to claim 1, wherein said operational information includes information indicative of whether or not a corresponding one of said controllers has failed;

said memory comprises a section that stores resource information relating to processing taken charge of by each said controller; and said at least one of the other controller to take over said processing comprises a section that accesses said resource information thereby acknowledging said processing to be taken over.

7. A storage control system according to claim 6, wherein said resource information includes information required by a corresponding one of said controllers for communication via said external communication path or said internal communication path.

8. A storage control system according to claim 6, wherein said resource information includes a network address of a corresponding one of said controllers used for communication via said external communication path.

9. A storage control system according to claim 6, wherein said operational information or said resource information relating to processing taken charge of by a corresponding one of said controllers is stored in said memory or said disk drive.

10. A storage control system according to claim 1, wherein said operational information includes information indicative of whether or not a corresponding one of said controllers has failed, said storage control system comprising a section that makes at least one other of said controllers take over processing being carried out by a failed controller if said monitor acknowledges that there is failure in said failed controller, wherein when said operational information can be accessed and the timestamp of one of said controllers has not been updated for a predetermined period of time or longer, said monitor determines that said one controller corresponding to said timestamp has failed.

11. A storage control system according to claim 1, wherein said internal communication path is configured in a redundant manner with a plurality of communication paths.

12. A storage control system according to claim 1, wherein each said controller comprises a section that sends its operational information to the others of said controllers via one other communication path connecting said controllers and being provided separate from said internal communication path; and each said controller sends, via said internal communication path, said operational information to be sent via said one other communication path.

13. A storage control system comprising:

a plurality of controllers configured to be coupled to an external communication path and operative to service file-level I/O requests from a host device over said external communication path;

a storage apparatus having a disk drive, a device interface that executes writing and reading data into and from said disk drive, and a memory; and an internal communication path configured for connection among said controllers and said device interface, each controller having a writer that writes operational information of said controller to said memory wherein a first one of said controllers writes operational information of said first controller to said memory via said internal communication path, each controller further operative to monitor said operational information, wherein a second one of said controllers monitors said operational information by accessing said memory via said internal communication paths, wherein said operational information includes information indicative of whether or not a corresponding one of said controllers has failed, said storage control system further comprising a section that makes at least one of the others of said controllers take over processing being carried out by a failed controller if it is acknowledged that there is failure in said failed controller, wherein said controller determines that said internal communication path has failed, if said operational information cannot be accessed.

wherein if said controller determines that said internal communication path has failed due to not being able to access said operation information, then said controller stops data I/O processing to said internal communication path.

14. A storage control system according to claim 13, wherein a data input/output request received by each said controller via said external communication path includes a file name;
said controller sends a data input/output command corresponding to said data input/output request to said memory via said internal communication path;
said memory receives and stores said data input/output command; and
said device interface executes writing or reading data into or from said disk drive according to said data input/output command stored in said memory.

15. A control method for a storage control system, said storage control system comprising:
a plurality of controllers, each for receiving file-level input/output requests from an external communication path;
a storage apparatus having a disk drive and a device interface that executes writing and reading data into and from said disk drive; and
an internal communication path connecting said controllers and said storage apparatus,
said control method including monitoring an operational state among said controllers, wherein each controller sends its own operational information to the other controllers via said internal communication path,
wherein said operational information includes information indicative of whether or not a corresponding one of said controllers has failed, said storage control system further comprising a section that makes at least one of the others of said controllers take over processing being carried out by a failed controller if it is acknowledged that there is failure in said failed controller,
wherein said controller determines that said internal communication path has failed, if said operational information cannot be accessed,
wherein if said controller determines that said internal communication path has failed due to not being able to access said operation information, then said controller stops data I/O processing to said internal communication path.

16. A control method for a storage control system according to claim 15, wherein said file-level input/output request includes a file identifier,
said controller notifies a data input/output command corresponding to said file-level input/output request to said device interface via said internal communication path, and
said device interface executes writing or reading data into or from said disk drive according to said data input/output command.

17. A control method for a storage control system comprising:
a plurality of controllers receiving file-level I/O requests inputted via an external communication path;
a storage apparatus having a disk drive, a device interface that executes writing and reading data into and from said disk drive, and a memory; and
an internal communication path connecting said controllers and said storage apparatus,
said control method wherein a first one of said controllers writes operational information of said first controller into said memory via said internal communication path; and
a second one of said controllers different from said first controller monitors said operational information by accessing said memory via said internal communication path,
wherein said operational information includes information indicative of whether or not a corresponding one of said controllers has failed, said storage control system further comprising a section that makes at least one of the others of said controllers take over processing being carried out by a failed controller if it is acknowledged that there is failure in said failed controller,
wherein said controller determines that said internal communication path has failed, if said operational information cannot be accessed,
wherein if said controller determines that said internal communication path has failed due to not being able to access said operation information, then said controller stops data I/O processing to said internal communication path.

18. A control method for a storage control system according to claim 17, wherein said file-level I/O requests include a file identifier,
said controller sends a data input/output command corresponding to said file-level I/O request having a file name designated to said memory via said internal communication path,
said memory receives and stores said data input/output command; and
said device interface executes writing or reading data into or from said disk drive according to said data input/output command stored in said memory.

* * * * *